US012732946B2

(12) United States Patent
He et al.

(10) Patent No.: US 12,732,946 B2
(45) Date of Patent: Sep. 8, 2026

(54) RSS-BASED EMERGENCY POSITIONING METHOD AND SYSTEM

(71) Applicant: City University of Hong Kong, Hong Kong (HK)

(72) Inventors: Jiajun He, Hong Kong (HK); Wenxin Xiong, Hong Kong (HK); Hing Cheung So, Hong Kong (HK)

(73) Assignee: City University of Hong Kong, Hong Kong (HK)

( * ) Notice: Subject to any disclaimer, the term of this patent is extended or adjusted under 35 U.S.C. 154(b) by 224 days.

(21) Appl. No.: 18/823,730

(22) Filed: Sep. 4, 2024

(65) Prior Publication Data

US 2025/0081151 A1 Mar. 6, 2025

Related U.S. Application Data

(60) Provisional application No. 63/580,988, filed on Sep. 6, 2023.

(51) Int. Cl.

*H04W 64/00* (2009.01)
*H04B 17/318* (2015.01)
*H04W 76/50* (2018.01)

(52) U.S. Cl.

CPC .......... *H04W 64/00* (2013.01); *H04B 17/318* (2015.01); *H04W 76/50* (2018.02)

(58) Field of Classification Search

CPC ..... H04W 64/00; H04W 76/50; H04B 17/318
See application file for complete search history.

(56) References Cited

U.S. PATENT DOCUMENTS

2018/0167796 A1* 6/2018 Raje .................... H04W 4/023
2024/0038058 A1* 2/2024 Sadu ...................... H04L 67/12
2026/0142778 A1* 5/2026 Saha .................... H04L 5/0051

* cited by examiner

*Primary Examiner* — Congvan Tran
(74) *Attorney, Agent, or Firm* — Idea Intellectual Limited; Sam T. Yip

(57) ABSTRACT

The present invention provides a received signal strength (RSS)-based emergency positioning method and system for locating a target user equipment (UE). The method comprises: broadcasting sidelink signals to request UEs from surroundings to transmit identification signals; identifying a target UE based on the plurality of identification signals; estimating, by the processor, a final RSS distance of the target UE with respect to the locator based on RSS values of received uplink signals; estimating an angle of arrival for the locator; and computing location of the targe UE based on the obtained RSS distance and the obtained angle of arrival. The present invention can locate the target position without the assistance of global positioning system (GPS) and macro base station (MBS), and achieve a better localization performance than the commercial MBS and GPS-based localization approaches.

20 Claims, 4 Drawing Sheets

| Device ID | Detector ID | Signal Type | Timestamp | Location Information |
| --- | --- | --- | --- | --- |

RSS-BASED EMERGENCY POSITIONING METHOD AND SYSTEM

CROSS-REFERENCE TO RELATED APPLICATIONS

The present application claims priority from the U.S. Provisional Patent Application No. 63/580,988 filed 6 Sep. 2023, and the disclosure of which is incorporated herein by reference in its entirety.

FIELD OF THE INVENTION

The present application is generally related to positioning technologies for emergency search and rescue, and specifically to received signal strength (RSS)-based emergency positioning method and system.

BACKGROUND OF THE INVENTION

The global positioning system (GPS) is commonly used for emergency search and rescue operations to locate missing individuals (targets) when emergency services are called. However, many cases report that the accuracy of commercial GPS technology is insufficient to precisely determine the target's location, failing to meet the accuracy requirements for effective emergency rescue. This inaccuracy can lead to missed optimal rescue opportunities. Moreover, search and rescue missions are often conducted in undeveloped areas where the number of macro base stations (MBSs) is usually limited. Therefore, relying solely on GPS and MBSs for emergency positioning is impractical.

Positioning methods based on time-difference-of-arrival (TDOA) are widely used in various applications. TDOA refers to the difference in arrival times of an emitted signal at a pair of sensors. Consequently, TDOA-based positioning requires synchronization across all sensors. In a long-term evolution (LTE) mobile network, sounding reference signals (SRSs) from spatially separated sensors can be acquired via the LTE uplink channel. Correlating these SRS sequences, the time corresponding to the strongest correlation peak can be used to compute the TDOA. However, these techniques are not suitable for indoor environments because TDOA data is typically reported by the base station, and positioning requires at least three base stations.

SUMMARY OF THE INVENTION

To address the aforementioned limitations, the present invention introduces an emergency positioning system that utilizes sidelink signals to accurately locate user positions in both indoor and outdoor environments without relying on MBSs and GPS. The system is versatile and applicable to various operating environments, ensuring efficient and accurate detection of the target user location in different scenarios.

In accordance with a first aspect of the present invention, a received signal strength (RSS)-based emergency positioning method using at least one processor and one or more locators is provided. The method comprises: broadcasting, by each locator, a plurality of sidelink signals to request a plurality of user equipments (UEs) to transmit a plurality of identification signals respectively; identifying, by the processor, a target UE based on the plurality of identification signals; transmitting, by the locator, a downlink signal to configure the target UE to transmit a periodic sequence of uplink signals; receiving, by the locator, the transmitted uplink signals; estimating, by the processor, a final RSS distance of the target UE with respect to the locator based on RSS values of the received uplink signals; estimating, by the processor, an angle of arrival for the locator based on a radiation pattern of the received uplink signals; and computing, by the processor, a location of the targe UE based on the obtained RSS distance and the obtained angle of arrival.

In accordance with a second aspect of the present invention, a received signal strength (RSS)-based emergency positioning system is provided. The system comprises: a processor; and one or more locators, each locator having a universal software radio peripheral and a respective antenna module. Each of the one or more locators is configured to: broadcast a plurality of sidelink signals to request a plurality of user equipments (UEs) to transmit a plurality of identification signals respectively; transmit a downlink signal to configure a target UE to transmit a periodic sequence of uplink signals; and receive the transmitted uplink signals. The processor is configured to: obtain an RSS distance of the target UE with respect to the locator based on an RSS value for the received uplink signals; obtain an angle of arrival for the locator based on a radiation pattern of the received uplink signals; and compute a location of the targe UE based on the obtained RSS distance and the obtained angle of arrival.

This approach leverages the received signal strength (RSS) extracted from the detected sidelink signals and the angle-of-arrival (AOA) measurements obtained by analyzing the RSS radiation pattern. The direct communication between the locator and the target UE eliminates the interference from the neighboring UEs, allowing for the acquisition of accurate and reliable RSS distance and AOA measurements. By exploiting the collected measurements, the location of the target UE can be determined. Compared with the conventional RSS and AOA estimation schemes, the provided method and system exhibit higher computational efficiency and decent estimation accuracy, offer the advantages of low hardware and computational complexity, and the capability to locate user positions without the need for GPS or MBS signals.

BRIEF DESCRIPTION OF THE DRAWINGS

Embodiments of the invention are described in more details hereinafter with reference to the drawings, in which.

DETAILED DESCRIPTION

In the following description, embodiments of the present invention are set forth as preferred examples. It will be apparent to those skilled in the art that modifications, including additions and/or substitutions may be made without departing from the scope and spirit of the invention. Specific details may be omitted so as not to obscure the invention. However, the disclosure is written to enable one skilled in the art to practice the teachings herein without undue experimentation.

Figure 1:
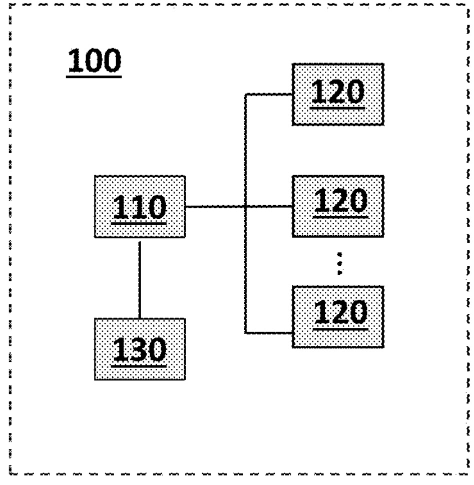
FIG. 1 shows a schematic block diagram of a received signal strength (RSS)-based emergency positioning system in accordance with one embodiment of the present invention.

FIG. 1 shows a schematic block diagram of a received signal strength (RSS)-based emergency positioning system 100 in accordance with one embodiment of the present invention. The emergency positioning system 100 comprise at least a processor 110, one or more target locators 120 developed based on a devised localization scheme, a memory 130 and other electronic modules. The processor 110 may be an advanced reduced instruction set computer (RISC) machine processor or implemented with any other suitable application-specific integrated circuits.

The emergency positioning system 100 may be implemented in a based station (e.g. an LTE base station) and built up with an interfacing software (e.g. the open-source software OpenAirInterface (OAI)) to encompass various parts of the 3rd generation partnership project (3GPP) protocol stack, including the core network and evolved node (eNode).

Figure 2:
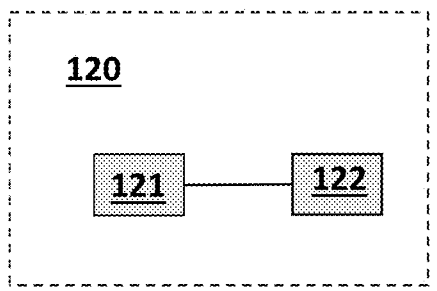
FIG. 2 shows a schematic block diagram of a target locater in accordance with one embodiment of the present invention.

FIG. 2 shows a schematic block diagram of a target locater 120. As shown, the locator 120 consists of a software-defined radio (SDR) platform hardware 121 and an antenna module 122. The locator 120 is configured to generate a plurality of sidelink signals, including frequency division multiple access (FDMA) and/or orthogonal frequency division multiplexing (OFDM) signals, in an established network such that a user equipment (UE) from the surrounding is able to connect to the established network.

The SDR platform hardware 121 may be a universal software radio peripheral (USRP) hardware which consists of an integrated direct conversion transceiver, a field programmable gate array (FPGA) and a universal serial bus (USB) port.

Figure 3:
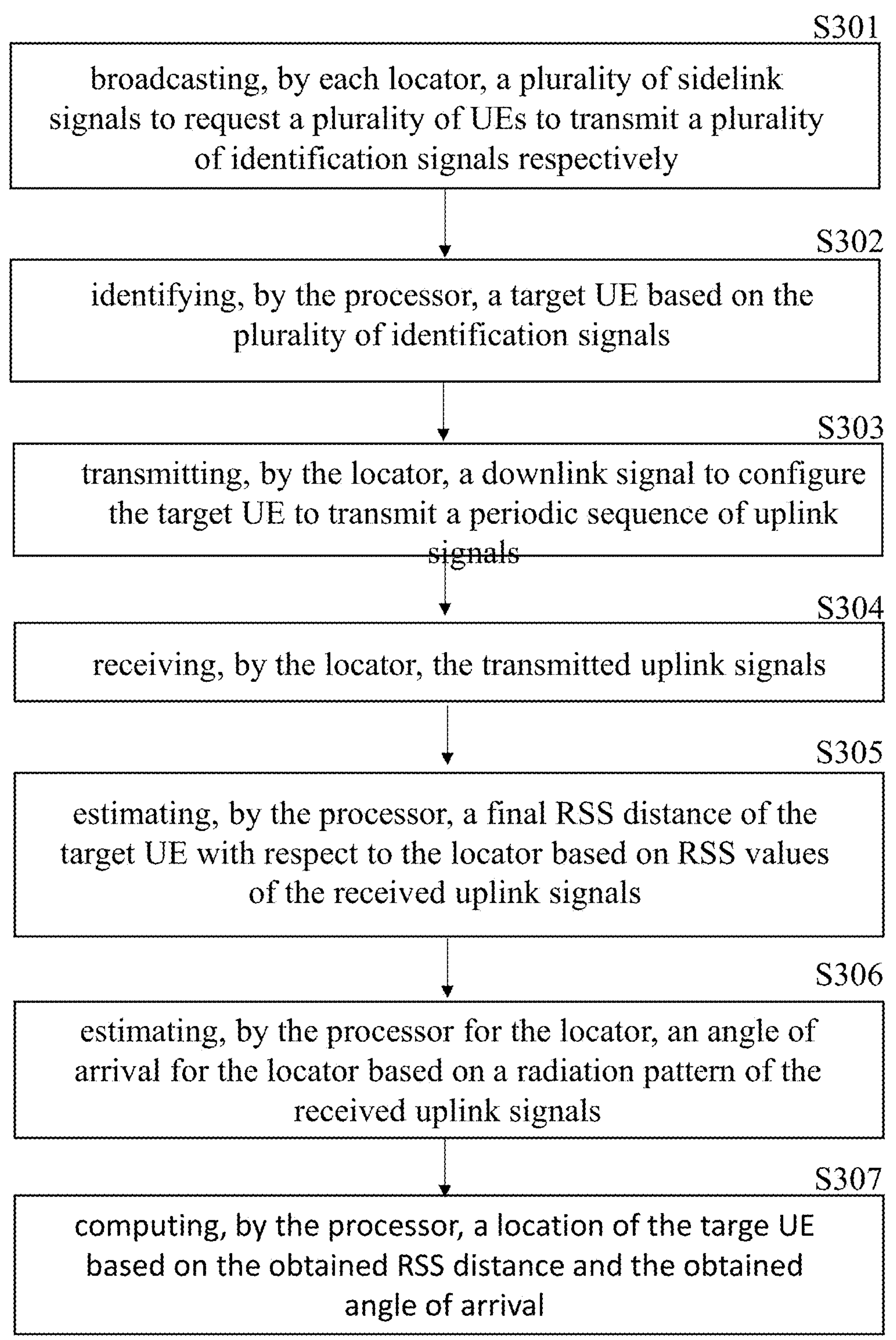
FIG. 3 shows a process flowchart of an RSS-based emergency positioning method using the positioning system in accordance with one embodiment of the present invention.

FIG. 3 shows a process flowchart of an RSS-based emergency positioning method using the positioning system in accordance with one embodiment of the present invention. The positioning method comprises the following steps:

- S301: broadcasting, by each locator, a plurality of sidelink signals to request a plurality of user equipments (UEs) to transmit a plurality of identification signals respectively.
- S302: identifying, by the processor, a target UE based on the plurality of identification signals;
- S303: transmitting, by the locator, a downlink signal to configure the target UE to transmit a periodic sequence of uplink signals;
- S304: receiving, by the locator, the transmitted uplink signals;
- S305: estimating, by the processor, a final RSS distance of the target UE with respect to the locator based on RSS values of the received uplink signals;
- S306: estimating, by the processor, an angle of arrival for the locator based on a radiation pattern of the received uplink signals; and
- S307: computing, by the processor, a location of the targe UE based on the obtained RSS distance and the obtained angle of arrival.

Figure 4:
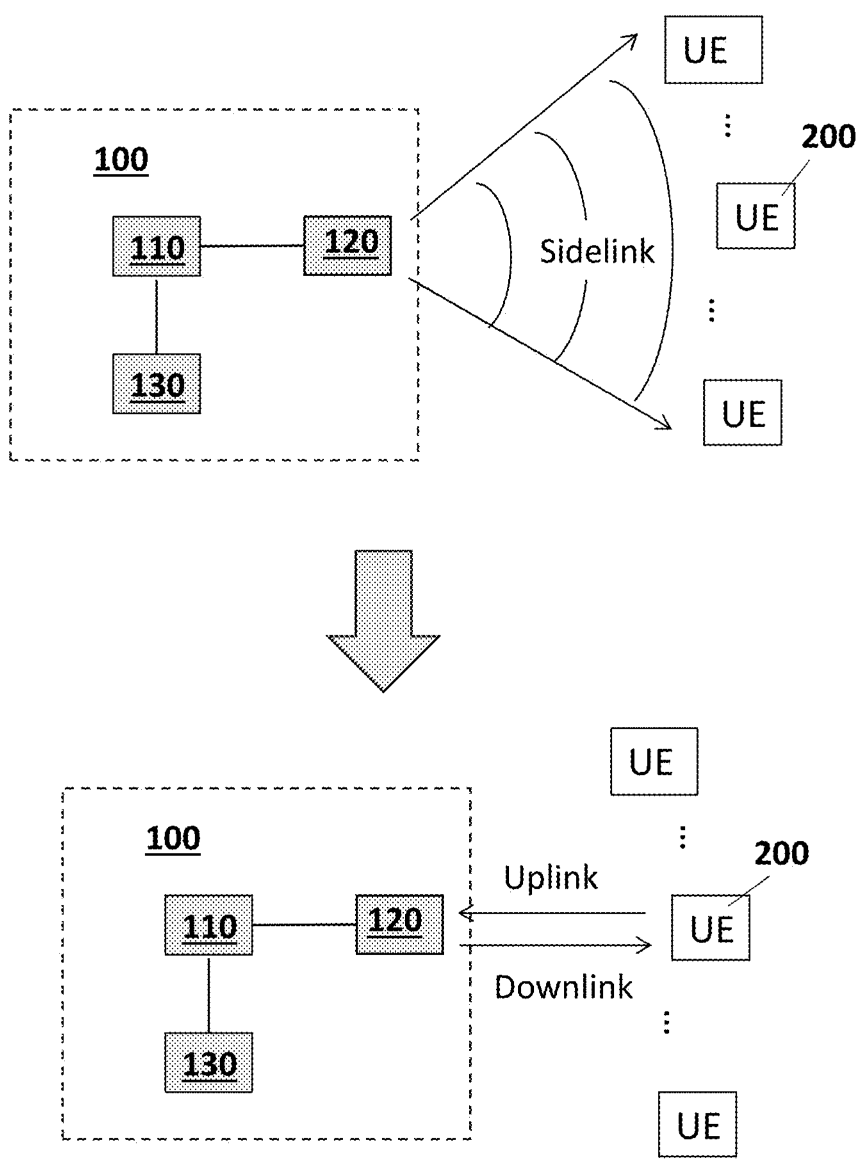
FIG. 4 shows a localization scheme in accordance with one embodiment of the present invention.

FIG. 4 shows a localization scheme in accordance with one embodiment of the present invention. Each locator 120 broadcasts sidelink signals (e.g. OFDM signals) with a relatively high transmission power to a plurality of UEs from the surrounding to detect a target UE 200, which guarantees that the target UE 200 will prioritize connecting to the deployed networks. When the target UE 200 is connected to the locator, its mobile device identity (MID) is sent to the locator to identify whether the connected UE is the target UE.

Figures 5, 6:
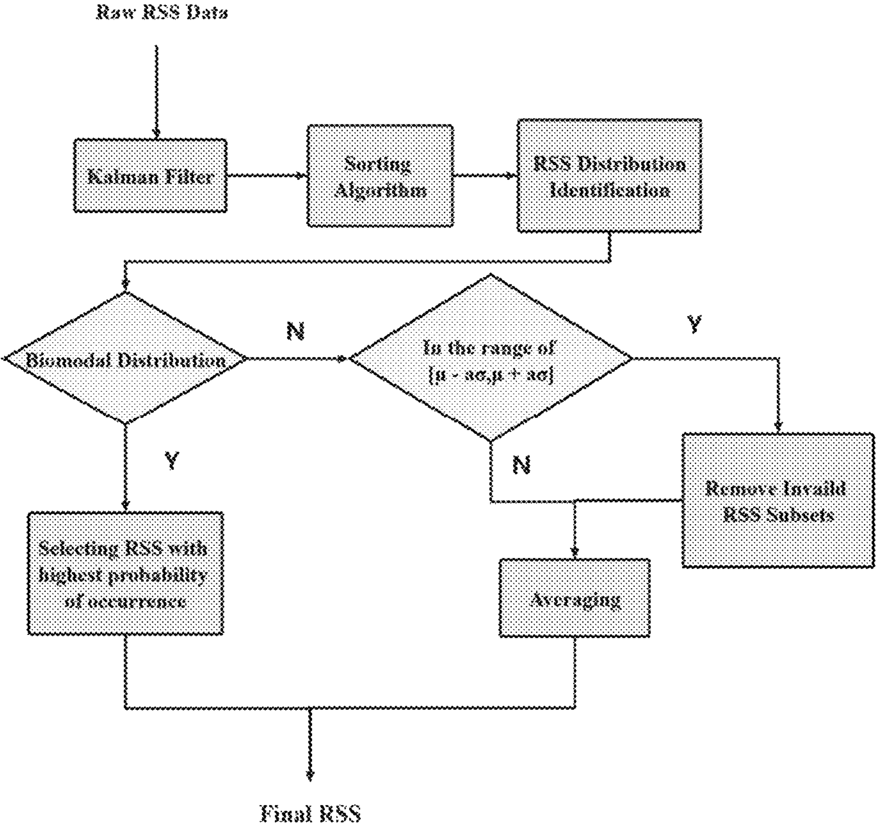
FIG. 5 shows a format of MID information stored in MID database in accordance with one embodiment of the present invention.
FIG. 6 shows an RSS extraction procedure in accordance with one embodiment of the present invention.

The MID information stored in the MID database may have a format as shown in FIG. 5. As shown, the database may include at least device ID that is the detected user equipment ID; locator (or detector) ID that is the detector ID associated with the target UE; signal type that is the sidelink signal type including FDMA or OFDM signals; timestamp that is the timestamp at which the UE is detected; and location information that includes location-related parameters between the detected target UE and the locator. Note that the mobile user must complete a pre-registration of his/her device ID via a mobile application in order for the locator to identify the UE's MID.

Referring back to FIG. 4, when the target UE 200 is found, direct communication between the target UE 200 and the locator 120 will be established to avoid interference from the nearby UEs. The locator 120 will transmit the downlink signals to configure the target UE 200, and the target UE 200 will then transmit the uplink signals periodically for localization.

If the target user equipment (UE) cannot connect to the OFDM-based network, the locator will transmit another type of sidelink signals, such as FDMA signals, to establish an FDMA-based network to locate the UE. Since the operating frequency of the FDMA signal is lower than that of OFDM, the FDMA-based network will have a larger coverage area, ensuring the successful detection of the UE. TDOA and RSS information are then extracted from the FDMA signal to obtain a coarse location of the target. Note that the FDMA signal alone is not sufficient to determine the final location of the target. Once the locator is close enough to connect to the target UE and obtain a coarse location, it will switch back to OFDM mode for higher precision to accurately determine the final location of the target UE.

The RSS information can be obtained from the detected uplink signals transmitted by the target UE. In wireless propagation environments, particularly those with obstacles, the RSS value tend to be unstable. To ensure that stable and reliable RSS measurements can be obtained, a reliable RSS extraction method is applied.

The extraction procedure is summarized in FIG. 6. Firstly, RSS measurements are collected and subjected to filtration using the Kalman filter technique to filter out noises in the RSS measurements due to measurement errors. Subsequently, the resulting filtered RSS values is arranged in ascending order to determine (or identify) the underlying probability distribution.

By analyzing the collected RSS data, the type of probability distribution of the RSS measurements is determined. The distribution of the RSS measurements can be categorized into: normal, bimodal, left-skewed, and right-skewed distributions. In a relatively stable environment (e.g. indoor), RSS distribution tends to be a normal distribution. In a multipath-dominated environment, RSS distribution is skewed to the left, whereas in a non-line-of-sight (NLOS)-dominated environment, a right-skewed distribution appears. A bimodal distribution may arise in case that there is a combination of NLOS paths and multipaths.

If the probability distribution is determined to be a bimodal distribution, the RSS measurement value with the highest probability of occurrence is regarded as the final output.

If the probability distribution is determined to be a non-bimodal distribution (that is, normal, left-skewed, or right-skewed distribution), the following judgment criteria is applied by defining a judgment variable p as:

$$\rho = \frac{1}{N}\left[\left(\frac{r_{RSS,1}-\mu}{\sigma}\right)^3 + \cdots + \left(\frac{r_{RSS,N}-\mu}{\sigma}\right)^3\right],$$

where N is the number of collected RSS observations (or measurements) and $r_{RSS}=[r_{RSS,1}, \ldots, r_{RSS,N}]$ is an RSS vector form of the collected RSS measurements from the uplink signals, μ and σ are the mean value and variance of the collected RSS measurements respectively.

Table 1 summarizes how the judgment criteria are defined based on values of judgment variable ρ.

TABLE 1

Values of Judgment Variable ρ for Judgment Criteria

| ρ | Distribution Type |
| --- | --- |
| <−1 | Left-skewed Distribution |
| [−1, 1] | Normal Distribution |
| >1 | Skewed-Right Distribution |

For left-skewed and right-skewed distributions, the invalid subsets of RSS data (i.e., outside the range of [μ−aσ, μ+aσ]) are removed. The mean value of the collected RSS data within the range of [μ−aσ, μ+aσ] are computed, and the computed mean value will be taken as the final RSS output, where a is the windowing parameter with positive value to control the range of the valid RSS data. Note that the value of a depends on the operating environment.

For a normal distribution, the mean value y of the collected RSS measurements is treated as the final output.

Furthermore, the locator is equipped with a directional antenna that allows for the estimation of the angle-of-arrival (AOA), that is, the direction corresponding to the maximum received signal strength (RSS) value, based on the antenna's radiation pattern.

Based on the collected RSS and AOA measurements, the location of target UE as is estimated as follows.

Single-Locator Localization

By denoting location of target UE as $\psi_t=[x_t, y_t]^T$, and the location of the locator as $\psi=[x, y]^T$, the estimated RSS distance and AOA between the locator and the target UE as $d_{RSS}$ and $\phi_{AOA}$, respectively, then the location of target UE can be computed as:

$$x_t = x + d_{RSS}\cos(\phi_{AOA}),$$

$$y_t = y + d_{RSS}\sin(\phi_{AOA}),$$

Multiple-Locator Localization

By denoting the location of target UE as $\psi_t=[x_t, y_t]^T$, and the location of the locator as $\psi_l=[x_l, y_l]^T$, where l=1, 2, . . . , L; the RSS distance between the l-th locator and the target UE as $d_{RSS,l}$, the location of the target UE can then be estimated using linear least squares (LLS) as follows.

Firstly, a linear equation system is constructed as $$A\theta \approx b,$$

$$A = \begin{bmatrix} -2x_1 & -2y_1 & 1 \\ -2x_2 & -2y_1 & 1 \\ \vdots & \vdots & \vdots \\ -2x_L & -2y_L & 1 \end{bmatrix},$$

-continued $$\theta = [x_t \quad y_t \quad x_t^2 + y_t^2]^T,$$

$$b = \begin{bmatrix} d_{RSS,1}^2 - x_1^2 - y_1^2 \\ d_{RSS,2}^2 - x_2^2 - y_2^2 \\ \vdots \\ d_{RSS,L}^2 - x_L^2 - y_L^2 \end{bmatrix}.$$

Then, the location estimate of the target UE is given by:

$$\hat{\theta} = (A\overline{\theta} - b)^T(A\overline{\theta} - b),$$

where $\overline{\theta}$ is the variable for θ, and its estimate $\hat{\theta}$ contains the x- and y-coordinates of the target UE, and $d_{RSS,l}$ is the RSS distance between the l-th locator and the target UE.

To ensure the localization accuracy of the devised invention, the above localization procedure can only be conducted when the target UE is able to detect the OFDM signals. The FDMA mode is applied to determine a coarse direction of the target UE when the OFDM signal is unavailable.

The embodiments were chosen and described in order to best explain the principles of the invention and its practical application, thereby enabling others skilled in the art to understand the invention for various embodiments and with various modifications that are suited to the particular use contemplated. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations. While the apparatuses disclosed herein have been described with reference to particular structures, shapes, materials, composition of matter and relationships . . . etc., these descriptions and illustrations are not limiting. Modifications may be made to adapt a particular situation to the objective, spirit and scope of the present disclosure. All such modifications are intended to be within the scope of the claims appended hereto.

The invention claimed is:

1. A received signal strength (RSS)-based emergency positioning method using at least one processor and one or more locators, the method comprising:

broadcasting, by each locator, a plurality of sidelink signals to request a plurality of user equipments (UEs) to transmit a plurality of identification signals respectively;

identifying, by the processor, a target UE based on the plurality of identification signals;

transmitting, by the locator, a downlink signal to configure the target UE to transmit a periodic sequence of uplink signals;

receiving, by the locator, the transmitted uplink signals;

estimating, by the processor, a final RSS distance of the target UE with respect to the locator based on RSS values of the received uplink signals;

estimating, by the processor, an angle of arrival for the locator based on a radiation pattern of the received uplink signals; and computing, by the processor, a location of the targe UE based on the obtained RSS distance and the obtained angle of arrival.

2. The received signal strength (RSS)-based emergency positioning method of claim 1, wherein the sidelink signals are orthogonal frequency division multiplexing (OFDM) signals or frequency division multiple access (FDMA) signals.

3. The received signal strength (RSS)-based emergency positioning method of claim 1, wherein the downlink signal is an orthogonal frequency division multiplexing (OFDM) signal.

4. The received signal strength (RSS)-based emergency positioning method of claim 1, wherein the uplink signals are orthogonal frequency division multiplexing (OFDM) signals.

5. The received signal strength (RSS)-based emergency positioning method of claim 1, wherein the RSS distance is obtained by:

subjecting the RSS values of the received uplink signals to a Kalman filter to obtain a subset of filtered RSS values;

arranging the subset of filtered RSS values in ascending order to determine a type of probability distribution of the filtered RSS values;

estimating the final RSS distance of the target UE based on the determined type of the probability distribution of the filtered RSS values.

6. The received signal strength (RSS)-based emergency positioning method of claim 5, wherein the step of arranging the subset of filtered RSS values in ascending order to determine the type of probability distribution of the filtered RSS values comprises:

defining a judgment variable p given by:

$$\rho = \frac{1}{N}\left[\left(\frac{r_{RSS,1}-\mu}{\sigma}\right)^3 + \cdots + \left(\frac{r_{RSS,N}-\mu}{\sigma}\right)^3\right],$$

where N is the number of the collected RSS observations, $r_{RSS}=[r_{RSS,1}, \ldots, r_{RSS,N}]$ is a RSS vector of a received uplink signal, μ and σ are the mean value and variance of the collected RSS measurements respectively; and determining the probability distribution to be:

a normal distribution if the judgment variable p is in an inclusive range of −1 to 1;

a left-skewed distribution if the judgment variable p is less than −1; or a right-skewed distribution if the judgment variable p is greater than 1.

7. The received signal strength (RSS)-based emergency positioning method of claim 5, wherein the step of estimating the final RSS distance of the target UE based on the determined type of the probability distribution of the filtered RSS values further comprises regarding an RSS value with the highest probability of occurrence as the final RSS distance when the probability distribution of the RSS values is determined to be bimodal.

8. The received signal strength (RSS)-based emergency positioning method of claim 7, wherein the step of estimating the final RSS distance of the target UE based on the determined type of the probability distribution of the filtered RSS values further comprises regarding the mean value y as the final RSS distance when the probability distribution of the RSS values is determined to be normal.

9. The received signal strength (RSS)-based emergency positioning method of claim 7, wherein the step of estimating the final RSS distance of the target UE based on the determined type of the probability distribution of the filtered RSS values further comprises, when the probability distribution of the RSS values is determined to be left-skewed or a right-skewed:

computing a corrected mean value $\mu_c$ for the RSS values within a range of [μ−aσ, μ+aσ], where a is an empirical coefficient depending on operating environment; and regarding the corrected mean value $\mu_c$ as the final RSS distance.

10. The received signal strength (RSS)-based emergency positioning method of claim 1, wherein the one or more locators include L number of locators with locations being denoted as $\psi_l=[x_l, y_l]^T$, where l=1, 2, . . . , L; and the location of the targe UE is denoted as $\psi_t=[x_t, y_t]^T$ and computed by a linear equation system given by:

$$\hat{\theta} = (A\overline{\theta} - b)^T(A\overline{\theta} - b),$$

$$A = \begin{bmatrix} -2x_1 & -2y_1 & 1 \\ -2x_2 & -2y_1 & 1 \\ \vdots & \vdots & \vdots \\ -2x_L & -2y_L & 1 \end{bmatrix},$$

$$\theta = [x_t \quad y_t \quad x_t^2 + y_t^2]^T,$$

$$b = \begin{bmatrix} d_{RSS,1}^2 - x_1^2 - y_1^2 \\ d_{RSS,2}^2 - x_2^2 - y_2^2 \\ \vdots \\ d_{RSS,L}^2 - x_L^2 - y_L^2 \end{bmatrix}.$$

where $\overline{\theta}$ is the variable for θ, and $\overline{\theta}$ is the estimate of θ containing the x- and y-coordinates of the target UE, and $d_{RSS,i}$ is the RSS distance between the l-th locator and the target UE.

11. A received signal strength (RSS)-based emergency positioning system, comprising a processor; and one or more locators, each locator having a universal software radio peripheral and σ respective antenna module;

wherein:

each of the one or more locators is configured to:

broadcast a plurality of sidelink signals to request a plurality of user equipments (UEs) to transmit a plurality of identification signals respectively;

transmit a downlink signal to configure a target UE to transmit a periodic sequence of uplink signals; and receive the transmitted uplink signals; and the processor is configured to:

obtain an RSS distance of the target UE with respect to the locator based on an RSS value for the received uplink signals;

obtain an angle of arrival for the locator based on a radiation pattern of the received uplink signals; and compute a location of the targe UE based on the obtained RSS distance and the obtained angle of arrival.

12. The received signal strength (RSS)-based emergency positioning system of claim 11, wherein the sidelink signals are orthogonal frequency division multiplexing (OFDM) signals or frequency division multiple access (FDMA) signals.

13. The received signal strength (RSS)-based emergency positioning system of claim 11, wherein the downlink signal is an orthogonal frequency division multiplexing (OFDM) signal.

14. The received signal strength (RSS)-based emergency positioning system of claim 11, wherein the uplink signals are orthogonal frequency division multiplexing (OFDM) signals.

15. The received signal strength (RSS)-based emergency positioning system of claim 11, wherein the RSS distance is obtained by:

subjecting the RSS values of the received uplink signals to a Kalman filter to obtain a subset of filtered RSS values;

arranging the subset of filtered RSS values in ascending order to determine a type of probability distribution of the filtered RSS values;

estimating the final RSS distance of the target UE based on the determined type of the probability distribution of the filtered RSS values.

16. The received signal strength (RSS)-based emergency positioning system of claim 15, wherein the step of arranging the subset of filtered RSS values in ascending order to determine the type of probability distribution of the filtered RSS values comprises:

defining a judgment variable ρ given by:

$$\rho = \frac{1}{N}\left[\left(\frac{r_{RSS,1}-\mu}{\sigma}\right)^3 + \cdots + \left(\frac{r_{RSS,N}-\mu}{\sigma}\right)^3\right],$$

where N is the number of the collected RSS observations, $r_{RSS}=[r_{RSS,1}, \ldots, r_{RSS,N}]$ is a RSS vector of a received uplink signal, μ and σ are the mean value and variance of the collected RSS measurements respectively; and determining the probability distribution to be:

a normal distribution if the judgment variable ρ is in an inclusive range of −1 to 1;

a left-skewed distribution if the judgment variable ρ is less than −1; or a right-skewed distribution if the judgment variable ρ is greater than 1.

17. The received signal strength (RSS)-based emergency positioning system of claim 15, wherein the step of estimating the final RSS distance of the target UE based on the determined type of the probability distribution of the filtered RSS values further comprises regarding an RSS value with the highest probability of occurrence as the final RSS distance when the probability distribution of the RSS values is determined to be bimodal.

18. The received signal strength (RSS)-based emergency positioning system of claim 17, wherein the step of estimating the final RSS distance of the target UE based on the determined type of the probability distribution of the filtered RSS values further comprises regarding the mean value y as the final RSS distance when the probability distribution of the RSS values is determined to be normal.

19. The received signal strength (RSS)-based emergency positioning system of claim 17, wherein the step of estimating the final RSS distance of the target UE based on the determined type of the probability distribution of the filtered RSS values further comprises, when the probability distribution of the RSS values is determined to be left-skewed or a right-skewed:

computing a corrected mean value $\mu_c$ for the RSS values within a range of [μ−aσ,μ+aσ], where a is an empirical coefficient depending on operating environment; and regarding the corrected mean value $\mu_c$ as the final RSS distance.

20. The received signal strength (RSS)-based emergency positioning system of claim 11, wherein the one or more locators include L number of locators with locations being denoted as $\psi_l=[x_l, y_l]^T$, where l=1, 2, . . . , L; and the location of the targe UE is denoted as $\psi_t=[x_t, y_t]^T$ and computed by a linear equation system given by:

$$\hat{\theta} = (A\overline{\theta} - b)^T(A\overline{\theta} - b),$$

$$A = \begin{bmatrix} -2x_1 & -2y_1 & 1 \\ -2x_2 & -2y_1 & 1 \\ \vdots & \vdots & \vdots \\ -2x_L & -2y_L & 1 \end{bmatrix},$$

$$\theta = [x_t \quad y_t \quad x_t^2 + y_t^2]^T,$$

$$b = \begin{bmatrix} d_{RSS,1}^2 - x_1^2 - y_1^2 \\ d_{RSS,2}^2 - x_2^2 - y_2^2 \\ \vdots \\ d_{RSS,L}^2 - x_L^2 - y_L^2 \end{bmatrix}.$$

where $\overline{\theta}$ is the variable for θ, and $\hat{\theta}$ is the estimate of θ containing the x- and y-coordinates of the target UE, and $d_{RSS,i}$ is the RSS distance between the l-th locator and the target UE.

* * * * *